Dec. 13, 1960 A. H. HAROLDSON ET AL 2,964,065
POLYTETRAFLUOROETHYLENE TUBING AND METHOD OF MAKING THE SAME
Filed April 30, 1958
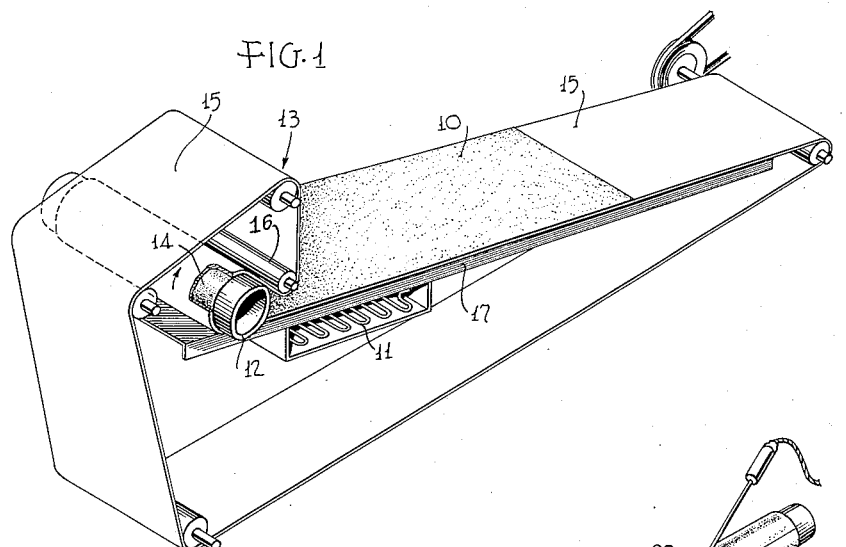
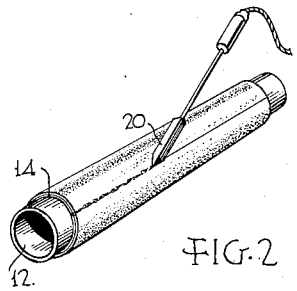
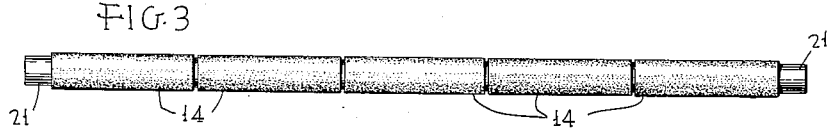
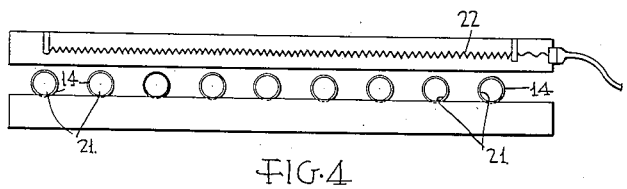
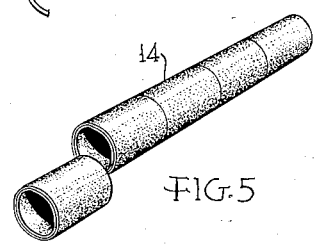
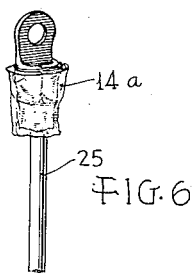
INVENTORS.
Arthur H. Haroldson.
John S. Taylor
BY William F. Cann, Jr.
Wm. R. Glisson
ATTORNEY

2,964,065

POLYTETRAFLUOROETHYLENE TUBING AND METHOD OF MAKING THE SAME

Arthur H. Haroldson, Newark, John S. Taylor, Wilmington, and William F. Cann, Jr., Newark, Del., assignors to Continental-Diamond Fibre Corp., Newark, Del., a corporation of Delaware Filed Apr. 30, 1958, Ser. No. 731,986

6 Claims. (Cl. 138—76)

This invention relates to polytetrafluoroethylene tubing and method of making the same and has for an object the provision of improvements in this art.

One of the particular objects is to provide a tube formed of polytetrafluoroethylene ("P.T.F.," "Teflon" or "Fluon," as it is variously designated) which has great circumferential strength. Such a tube is especially useful for forming terminal sleeves for electrical conductors which are crimped to secure them on the terminal leads.

It is now a common practice to extrude tubing of this plastic from a mixture of the flocculated unsintered material and a plasticizer or extrusion aid, then to eliminate the plasticizer by vaporization or otherwise and thereafter sinter the tubing. However, this extruded tubing, even after sintering, lacks the necessary circumferential strength to withstand crimping without splitting or cracking.

According to the present invention a tube is formed by winding a plurality of layers of plastic tape or sheet on a mandrel and thereafter sintering it. It is not satisfactory merely to wind the sheet in any fashion and in random orientation on the mandrel because of the fact that unoriented polytetrafluoroethylene has a very high coefficient of thermal expansion and when heated for sintering will expand so much that it will move free of the mandrel and accurate dimensions and suitable wall density cannot be attained.

The present invention overcomes this difficulty by forming the tube windings from calendered sheet or tape with the longitudinal or machine direction of the tape arranged circumferentially in the winding. In spite of the high coefficient of thermal expansion of the material in random orientation, calendered material has a high coefficient of thermal shrinkage in length, i.e., in the machine direction, and when such a wound tube is heated for sintering the wound layers are shrunk together to produce a very dense wall of accurate dimensions and relatively great strength. And while others have found it necessary to confine the wound layers of a tube to prevent expansion, as by layers of fiber glass fabric (see Patent 2,783,173 Walker), it is possible by the present invention to secure the desired accurate dense tubing merely by the self-constricting action of the wound material itself without any mechanical confinement whatever.

The invention will be better understood from the following description of an exemplary embodiment thereof, reference being made to the accompanying drawings, wherein:

Fig. 1 is a perspective view showing a calendered tape being wound on a mandrel;

Fig. 2 is a perspective view showing the end seam of the roll being sealed and smoothed down;

Fig. 3 shows several rolls on a long mandrel ready for sintering;

Fig. 4 shows roll on mandrels moving through a sintering oven;

Fig. 5 shows a sintered roll being cut into lengths; and

Fig. 6 shows terminal sleeves being applied.

As shown in the drawings, a length of extruded and calendered polytetrafluoroethylene sheet or tape 10 is heated to make its layers sufficiently adherent to stick together, as by a heater 11, and is wound on a mandrel 12 by known winding apparatus 13 to form a convolute wound tube 14 on the mandrel. The winding apparatus can be of various known forms, that shown being of the general type of that shown in Frederick 1,921,516.

There is no need to show or describe this apparatus in detail, it being sufficient to note that a mandrel 12 is pushed into the bend of a moving belt 15 and a retaining roll 16 with the belt passing around it brought down behind the mandrel. The belt runs over a heated table 17 and can be tightened or loosened as article change may require. The calendered tape is fed in between the belt and mandrel and is wound on the mandrel by the passage of the belt. The sheet fed can either be taken from a roll and cut off when a given length has been wound on the mandrel or can be first be cut to length and then wound on the mandrel. The latter is illustrated for simplicity.

Each mandrel is preliminarily coated with a parting agent of known type to assist in the later removal of the wound tube from the mandrel.

In Fig. 1 the sheet of unsintered calendered polytetrafluoroethylene being fed in is shown as being advanced longitudinally in the direction in which it was run between the calendering rolls and it has greatest strength in the longitudinal or machine direction. The sheet also has very considerable transverse strength to avoid splitting in the unsintered state due to the particular method of formation by extruding and calendering, as set forth in the copending application of Arthur H. Haroldson et al., Serial No. 674,463, filed July 26, 1957, now Patent Number 2,915,786. In the extruded but uncalendered and unsintered state the tape has substantially no strength in the tranverse direction and will pull apart into stringy strips.

After the tube has been wound, the end of the winding is preferably heated and pressed as by a heated iron 20 to smooth the joint and assure that there will be no opening up at this seam in further operations.

Subsequent to winding, the tubes are sintered. This can be done with the tubes still on the same mandrels 12 on which they were wound, but since the tubes actually tend to shrink during sintering to grip the mandrels it is preferable to strip them off the winding mandrels 12 and place them on a somewhat smaller mandrel to make stripping easier after sintering. A long mandrel 21 may be used to hold a number of lengths of tube 14 for sintering.

The tubes are sintered for the required time at the required temperature. For example a number of mandrels 21 with tubes thereon are shown as passing through a sintering oven 22. The winding with the end seam sealed has enough strength to maintain the tube size during sintering without external confinement which has heretofore been required for extruded tubes which do not have circumferential strength and fiber orientation to provide such circumferential strength as is hereby provided by winding calendered tape in the manner disclosed.

If the tubes tend to adhere to the mandrels after sintering, in spite of pre-coating the mandrels with a release agent, they may be loosened enough to cause them to strip off easily by rubbing on a flat table.

The sintered tube is cut into required lengths, as shown in Fig. 5 and a length 14a is crimped on a terminal 25, as shown in Fig. 6.

The ability of the sleeve to be crimped and reformed under pressure and heat, without splitting as is the case, indicates that the sleeve has the high degree of toughness desired and which has not heretofore been attained with this material.

Instead of sintering full lengths of wound tubes, the unsintered wound tubes may be cut into suitable lengths and slipped on the terminals. Then when they are sintered they will shrink tightly thereon. This can be done in cases where the related materials can withstand the sintering heat without injury.

In other cases the cut tubes can be treated in known way to make them cementable and are then cemented on.

What is claimed is:

1. The method of making a tube of polytetrafluoroethylene which has great circumferential strength and resistance to splitting when crimped, comprising in combination, winding a calendered unsintered sheet having great strength in the longitudinal or machine direction in plural layers upon a core with the machine direction of the sheet wound in a circumferential direction on the core, and sintering the wound tube to cause contraction in the circumferential direction to form a tight solid-walled tube on the core.

2. The method as set forth in claim 1, further characterized by the fact that said sheet is heated sufficiently as it is wound on the core to make its layer hold together during further handling.

3. The method as set forth in claim 1, further characterized by the fact that the outer end of the wound tube coil is heated and pressed to smooth the outer surface and cause the end to adhere to the coil.

4. The method as set forth in claim 1, further characterized by the fact that said sheet is heated sufficiently as it is wound on the core to make its layers hold together during further handling, and that the outer end of the wound tube coil is heated and pressed to smooth the outer surface and cause the end to adhere to the coil.

5. The method as set forth in claim 1, further characterized by the fact that the wound tube is sintered free of pressure confinement.

6. As an article of manufacture, a tube adapted to be crimped by flattening its sides without splitting or cracking, comprising a plurality of layers of extruding calendered polytetrafluoroethylene tape wound circumferentially in the machine direction as formed by the calender rolls with the layers sintered together in the wound tube.

References Cited in the file of this patent

UNITED STATES PATENTS

| | | |
|---|---|---|
| 2,093,087 | Lynn | Sept. 14, 1937 |
| 2,176,153 | Semon | Oct. 17, 1939 |
| 2,783,173 | Walker et al. | Feb. 26, 1957 |
| 2,787,289 | Press | Apr. 2, 1957 |